United States Patent
Lee et al.

(10) Patent No.: US 9,743,162 B2
(45) Date of Patent: Aug. 22, 2017

(54) APPARATUS AND METHOD FOR MANAGING OTN TRAFFIC IN PACKET-CIRCUIT INTEGRATED TRANSPORT SYSTEM BASED ON MULTILAYER-INTEGRATED FABRIC SWITCH

(71) Applicant: ELECTRONICS AND TELECOMMUNICATIONS RESEARCH INSTITUTE, Daejeon-si (KR)

(72) Inventors: Won Kyoung Lee, Daejeon-si (KR); Ho Geon Kim, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 61 days.

(21) Appl. No.: 14/748,432

(22) Filed: Jun. 24, 2015

(65) Prior Publication Data
US 2015/0381513 A1    Dec. 31, 2015

(30) Foreign Application Priority Data
Jun. 27, 2014  (KR) .................... 10-2014-0080128

(51) Int. Cl.
*H04J 1/00* (2006.01)
*H04Q 11/00* (2006.01)
(Continued)

(52) U.S. Cl.
CPC ........ *H04Q 11/0066* (2013.01); *H04J 3/1658* (2013.01); *H04L 47/36* (2013.01); *H04Q 2011/0064* (2013.01)

(58) Field of Classification Search
CPC ......... H04Q 11/0066; H04Q 2011/0064; H04J 3/1658; H04J 47/36
See application file for complete search history.

(56) References Cited

U.S. PATENT DOCUMENTS 7,643,510 B2 * 1/2010 Li ........................... H04L 12/24
370/466
8,155,520 B1 * 4/2012 West ....................... G02B 6/43
398/50
(Continued)

FOREIGN PATENT DOCUMENTS

CN        103281263 A    9/2013
KR        101252826 A    4/2013

*Primary Examiner* — Abdelnabi O Musa
(74) *Attorney, Agent, or Firm* — Ladas & Parry LLP

(57) ABSTRACT

Provided is an OTN traffic management method of a traffic management apparatus included in an OTN line card that accepts OTN traffic and transmits the OTN traffic to a multilayer-integrated fabric switch; or accepts traffic, in units of cells, from the multilayer-integrated fabric switch and transmits, to a network, the OTN traffic that the OTN line card generates. The OTN traffic management method includes restoring a received Interlaken packet to an OTN frame; adding an ITMOH that contains information about an ODU payload size to the OTN frame; converting the OTN frame, to which the ITMOH has been added, into to fabric cell by further adding a fabric overhead; and transmitting the fabric cell to the multilayer-integrated fabric switch.

9 Claims, 10 Drawing Sheets

(51) Int. Cl.
    *H04L 12/805*     (2013.01)
    *H04J 3/16*     (2006.01)

(56) References Cited

U.S. PATENT DOCUMENTS

| | | | |
|---|---|---|---|
| 2004/0090995 A1 | 5/2004 | Kang et al. | |
| 2010/0086300 A1* | 4/2010 | Jiang | H04J 3/1658 398/46 |
| 2012/0039609 A1* | 2/2012 | Dong | H04J 3/1652 398/66 |
| 2014/0334816 A1* | 11/2014 | Guo | H04Q 11/0003 398/45 |

* cited by examiner

APPARATUS AND METHOD FOR MANAGING OTN TRAFFIC IN PACKET-CIRCUIT INTEGRATED TRANSPORT SYSTEM BASED ON MULTILAYER-INTEGRATED FABRIC SWITCH

CROSS-REFERENCE TO RELATED APPLICATION(S)

This application claims priority from Korean Patent Application No. 10-2014-0080128, filed on Jun. 27, 2014, in the Korean Intellectual Property Office, the disclosure of which is incorporated herein by reference in its entirety.

BACKGROUND

1. Field

The following description relates to a packet-circuit integrated transport system capable of simultaneously transmitting packet traffic, such as Ethernet, Internet protocol (IP), and multiprotocol label switching (MPLS) packets, and circuit traffic, such as SONET/SDH, optical transport network (OTN) traffic, and more particularly, to an apparatus and method for efficiently managing and controlling OTN traffic.

2. Description of the Related Art

Generally, optical-packet-circuit integrated transport systems have been developed by providing independent fabric switches for each layer of a shelf in order to switch traffic for each layer, or by adding a switching circuit between fabrics. The existing switching method is complicated since all fabric switches for different layers need to be managed and operated, and it is inefficient in terms of system configuration.

To address such drawbacks, a multilayer-integrated fabric switch that allows for switching between packet and circuit traffics has been developed. The multilayer-integrated fabric switch uses fabric overhead to switch packet or circuit traffics to a destination line card; in the process of adding or removing the fabric overhead to/from the packet or circuit traffic causes the traffic speed to increase.

Generally, flow control is used to control a traffic rate so that is does not exceed an ODU payload rate, but is the same as the ODU payload rate. However, the existing traffic control method does not take into consideration a rate required to process fabric overhead which is needed in a multilayer-integrated fabric switch transport, and thus errors in OTN traffic, for example, OOF/LOM during OTN traffic transport based on the multilayer-integrated fabric switch have occurred.

SUMMARY

The following description relates to an optical transport network (OTN) traffic management apparatus and method for solving faults of OTN traffic, which may occur in an optical-circuit-packet integrated transport system, based on a multilayer-integrated fabric switch.

In one general aspect, there is provided a traffic management apparatus which is included in an optical transport network (OTN) line card that accepts OTN traffic and transmits the OTN traffic to a multilayer-integrated fabric switch; accepts traffic, in units of cells, from the multilayer-integrated fabric switch; and transmits, to a network, the OTN traffic that the OTN line card generates, the traffic management apparatus including: a network interface configured to generate an OTN frame from an Interlaken packet, transmit the OTN frame, and receive an OTN frame; a fabric interface configured to transmit and receive a fabric cell to and from the multilayer-integrated fabric switch; an ingress traffic manager configured to add an internal traffic management overhead (ITMOH) that contains information about the optical channel data unit (ODU) payload size to an OTN frame output from the network interface, and transmit a resultant OTN frame to the fabric interface; and an egress traffic manager configured to adjust a queueing rate and a dequeuing rate by taking into consideration the ODU payload size written in the ITMOH of the fabric cell output from the fabric interface.

In another general aspect, there is provided an OTN traffic management method of a traffic management apparatus included in an OTN line card that accepts OTN traffic and transmits the OTN traffic to a multilayer-integrated fabric switch; or accepts traffic, in units of cells, from the multilayer-integrated fabric switch and transmits, to a network, the OTN traffic that the OTN line card generates, the OTN traffic management method including: restoring a received Interlaken packet to an OTN frame; adding an ITMOH that contains information about an ODU payload size to the OTN frame; converting the OTN frame, to which the ITMOH has been added, into fabric cell by further adding a fabric overhead; and transmitting the fabric cell to the multilayer-integrated fabric switch.

In yet another general aspect, there is provided an OTN traffic management method of a traffic management apparatus included in an OTN line card that accepts OTN traffic and transmits the OTN traffic to a multilayer-integrated fabric switch or accepts traffic in units of cells from the multilayer-integrated fabric switch, and transmits, to a network, the OTN traffic that the OTN line card generates, the OTN traffic management method including: removing the fabric overhead from fabric cell received through the multilayer-integrated fabric switch; adjusting both an enqueuing and dequeuing rates of egress traffic by taking into account an ODU payload size of the fabric cell; and restoring the fabric cell to an OTN frame by removing the ITMOH from the fabric cell.

Other features and aspects will be apparent from the following detailed description, the drawings, and the claims.

Figure 1:
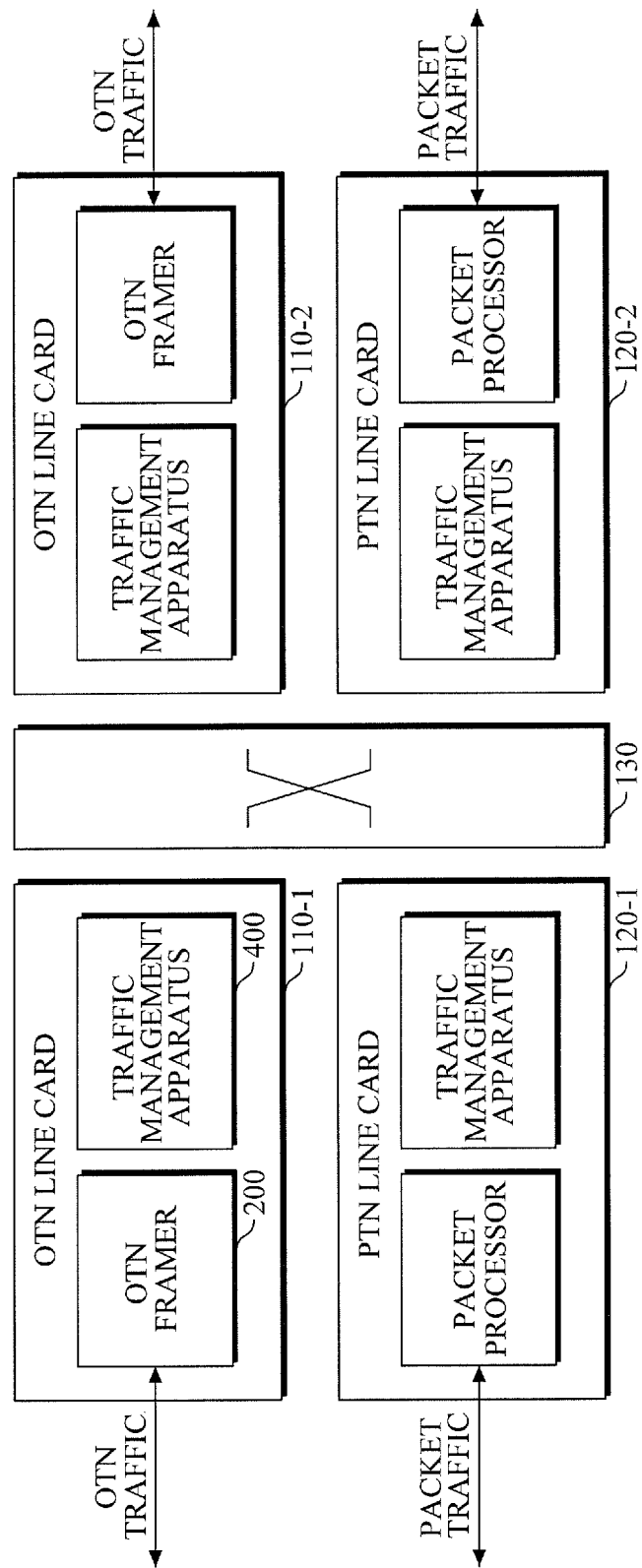
FIG. 1 is a diagram illustrating a configuration of a multilayer-integrated transport system based on a multilayer-integrated fabric switch according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The exemplary embodiments now will be described more fully hereinafter with reference to the accompanying figures. In the following description, a detailed description of known functions and configurations incorporated herein will be omitted when it may obscure the subject matter with unnecessary detail. Terms used throughout this specification are defined in consideration of functions according to exemplary embodiments, and can be varied according to a purpose of a user or manager, or precedent and so on. Therefore, definitions of the terms should be made on the basis of the overall context.

As the transport technologies have evolved into integrated multilayer-integrated transport systems for optical circuit-packet layers, the existing traffic switching method in which individual fabric switches for different layers are provided for traffic switching at each layer (as disclosed by U.S. Pat. No. 8,155,520, titled "Multi-fabric shelf for a transport network") is evolving into traffic switching based on multilayer-integrated fabric switch technology. The multilayer-integrated fabric switch enables a system configuration to be simplified, thereby advantageously reducing cost such as OPEX and CAPEX.

FIG. 1 is a diagram illustrating a configuration of a multilayer-integrated transport system based on a multilayer-integrated fabric switch according to an exemplary embodiment.

Referring to FIG. 1, optical transport network (OTN) line cards 110-1 and 110-2 accept circuit traffic from SONET/SDH, OTN, or the like, and transport the traffic to a multilayer-integrated fabric switch 130; the OTN line cards also accept traffic in units of cells from the multilayer-integrated fabric switch 130, generate OTN traffic, and transmit the OTN traffic to a circuit network.

Packet transport line cards 120-1 and 120-2 accept packets, such as, Ethernet packets, IP packets, multiprotocol label switching (MPLS) packets, or the like, and transmit the packets to other line cards through the multilayer-integrated fabric switch 130.

The multilayer-integrated fabric switch 130 segments packets into cells, and then transmits them to a line card. At this time, the multilayer-integrated fabric switch is able to switch between different line cards using information in a fabric switch header.

Figure 2:
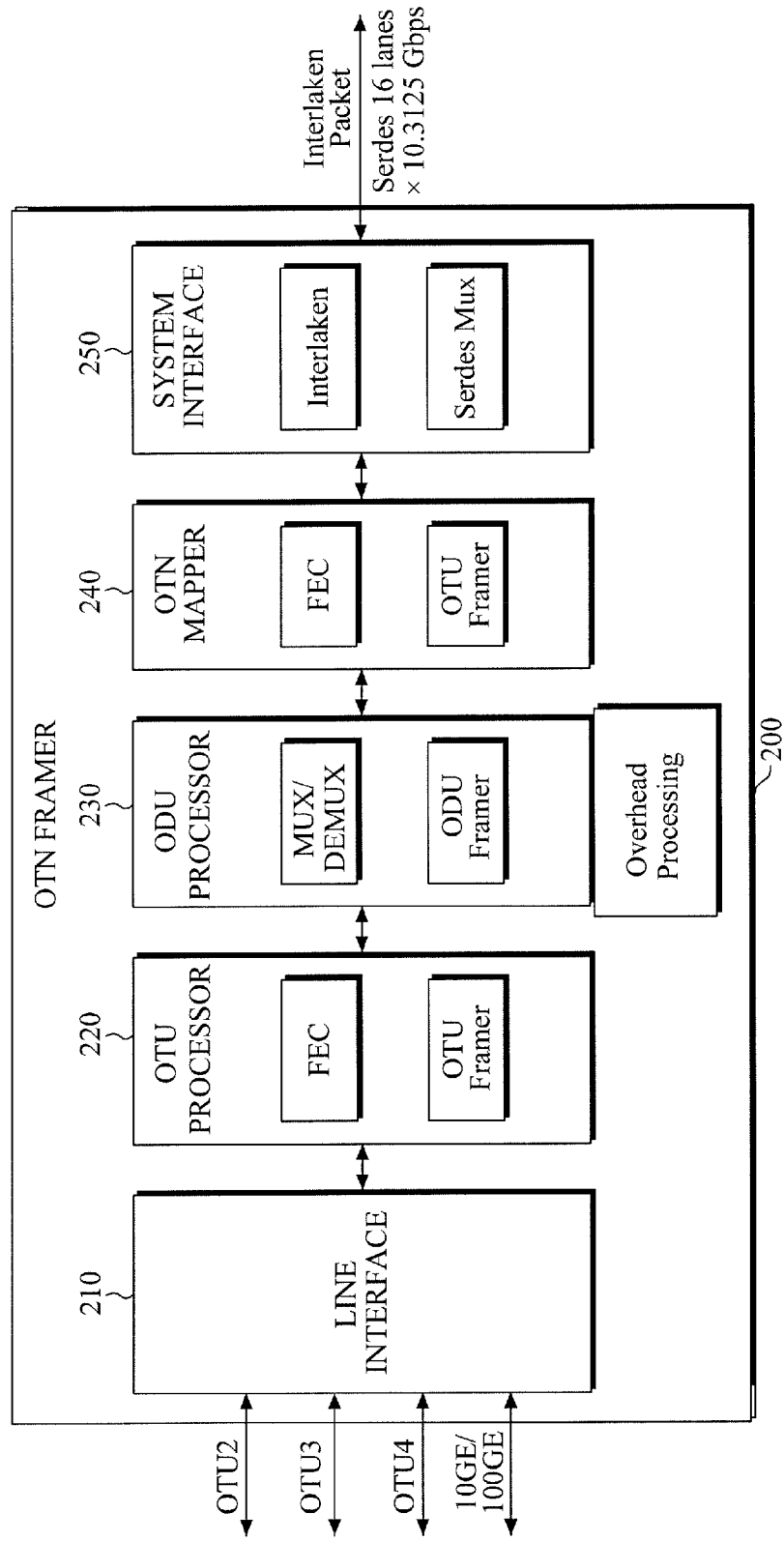
FIG. 2 is a diagram illustrating a structure of an optical transport network (OTN) framer of an OTN line card.
Figure 3:
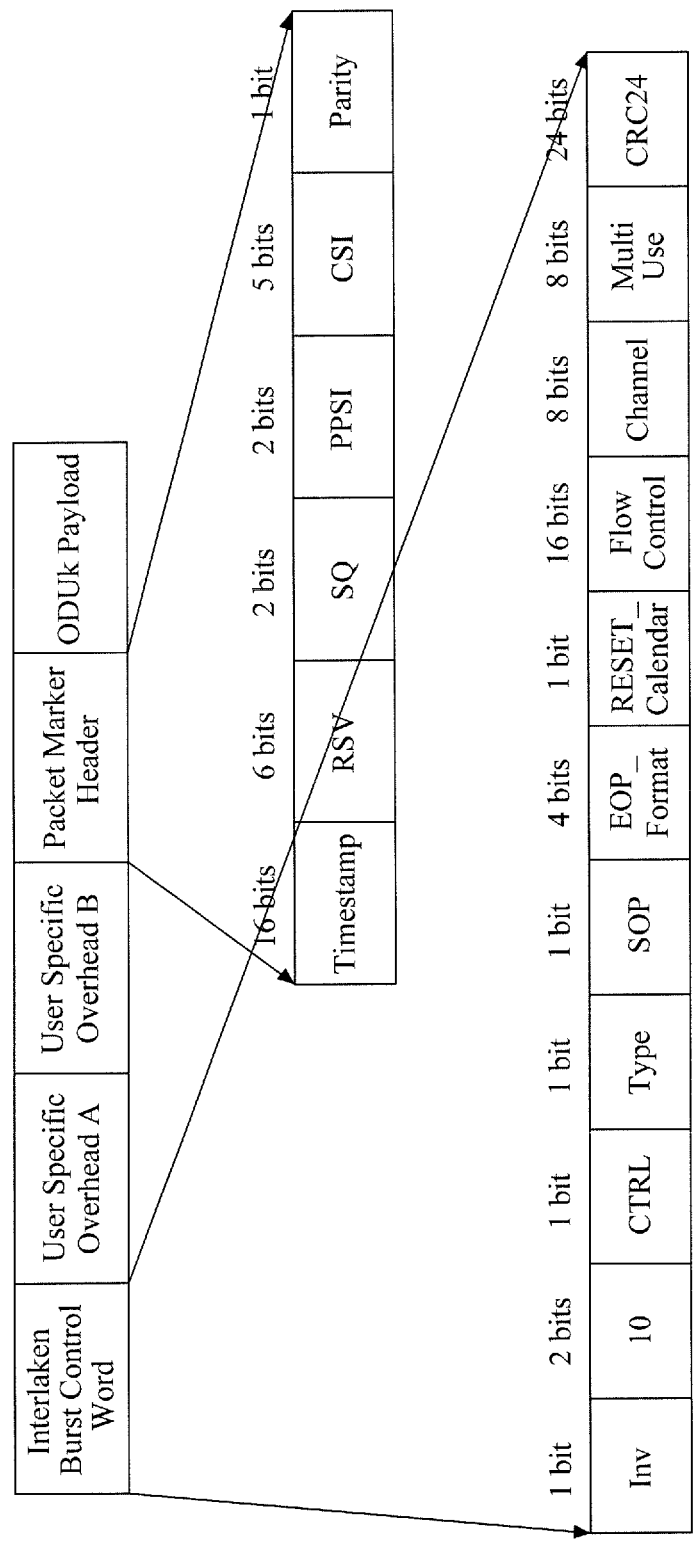
FIG. 3 is a diagram explaining a format of an Interlaken packet.

FIG. 2 is a diagram illustrating a structure of an OTN framer of an OTN line card; and FIG. 3 is a diagram explaining a format of an Interlaken packet.

Referring to FIG. 2, a line interface 210 may accept OTN traffic of OTU2, OTU3, and/or OTU4 and PTN traffic of 10 GE/100 GE from a network.

An optical transport unit (OTU) processor 220 terminates an OTU by removing the OTU's header from the OTN traffic received from the line interface 210. On the other hand, the OTU processor 220 generates an OTU by adding OTU header into an optical channel data unit (ODU) frame received from an ODU processor 230. Furthermore, the OTU processor 220 also processes forward error correction (FEC) operations.

The ODU processor 230 processes ODU headers, multiplexes a number of low-order ODUs into a single high-order ODU, or demultiplexes a single high-order ODU into a number of low-order ODUs.

An OTN mapper 240 may map client packets, such as Ethernet packets, into OTN traffic using either generic mapping procedure (GMP) or generic framing procedure-framed (GFP-F), depending on the type of client packet.

An interface for connection between the OTN framer 200 within the OTN line card and a traffic management apparatus 400 is the Interlaken interface. A system interface 250 generates and transmits an Interlaken packet with a format shown in FIG. 3.

Figure 4:
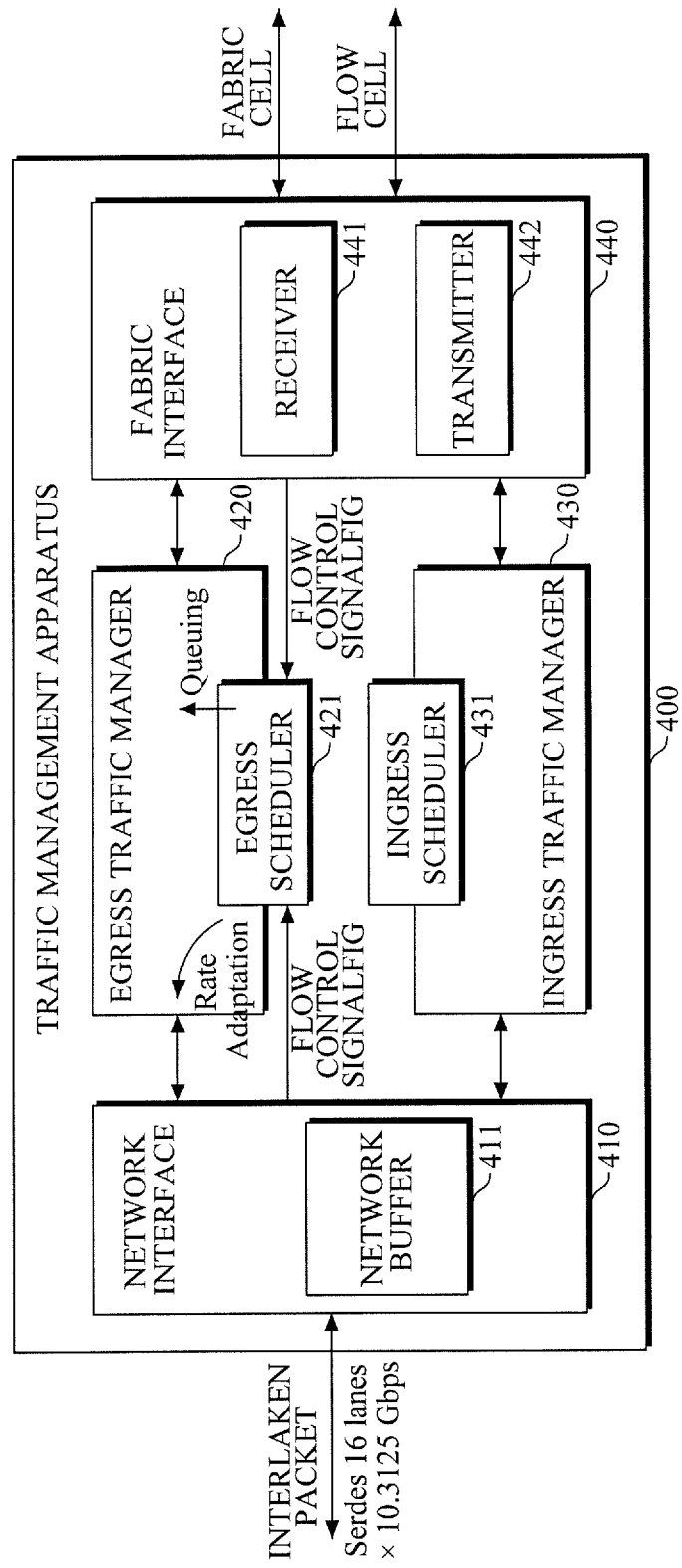
FIG. 4 is a diagram illustrating a configuration of a traffic management apparatus.

FIG. 4 is a diagram illustrating a configuration of a traffic management apparatus.

Referring to FIG. 4, a traffic management apparatus 400 includes a network interface 410, an egress traffic manager 420, an ingress traffic manager 430, and a fabric interface 440. The network interface 410 is used to transmit packets through an Interlaken interface, and the fabric interface 440 is used to transmit packets to a multilayer-integrated fabric switch 130.

The OTN framer 200 (referring to FIG. 2) is connected to the traffic management apparatus 400 in FIG. 4 by a maximum of up to 24 serializer/deserializer lanes (hereinafter, referred to as "SerDes"), each of which may have a transfer rate of one of 3.125, 6.25, 10.3124, 11.5, and 12.5 Gbps. The network interface 410 includes a network buffer to store Interlaken packets and an Interlaken protocol module to restore an Interlaken packet to an OTN frame.

An egress scheduler 421 of the egress traffic manager 420 controls the rate at which packets are stored in an egress traffic queue and the rate at which packets are transmitted to the network interface 410 in response to a flow control signal.

The network interface 410 restores an Interlaken packet to an OTN frame (ODU payload). While passing through the ingress traffic manager 430, the OTN frame (ODU payload) has an internal traffic management overhead (ITMOH) added thereto. In the fabric interface 440, the OTN frame is converted into a fabric cell by adding a fabric overhead thereto, and the fabric cell is transmitted to the multilayer-integrated fabric switch 130.

On the contrary, while passing through the fabric interface 440 of the traffic management apparatus 400, the fabric overhead is removed from its fabric cell, received through the multilayer-integrated fabric switch 130. The ITMOH is also removed from the fabric cell as the fabric cell passes through the egress traffic manager 420; the packet is then transmitted to the network interface 410.

Figure 5:
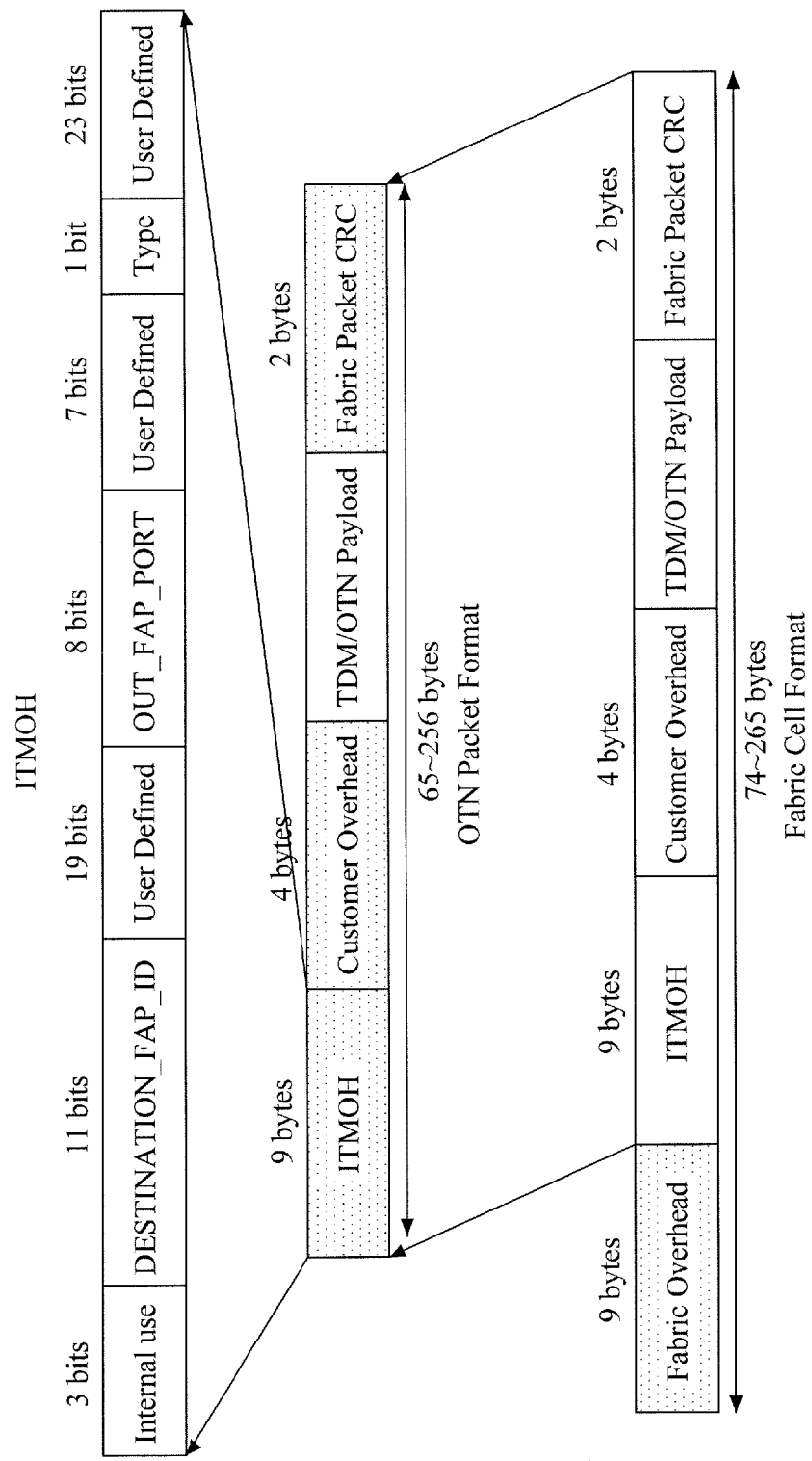
FIG. 5 is a diagram illustrating a format of an internal traffic management overhead (ITMOH) and that of a fabric overhead.

FIG. 5 is a diagram illustrating a format of an ITMOH and that of a fabric overhead.

Referring to FIG. 5, a fabric cell to be transmitted to a fabric interface is generated by adding 9-byte ITMOH, 4-byte customer overhead, 2-byte fabric packet CRC, and 9-byte fabric overhead into the OTN frame. The ITMOH may contain information, such as the number of a destination line card, destination port number, and so on.

Figure 6:
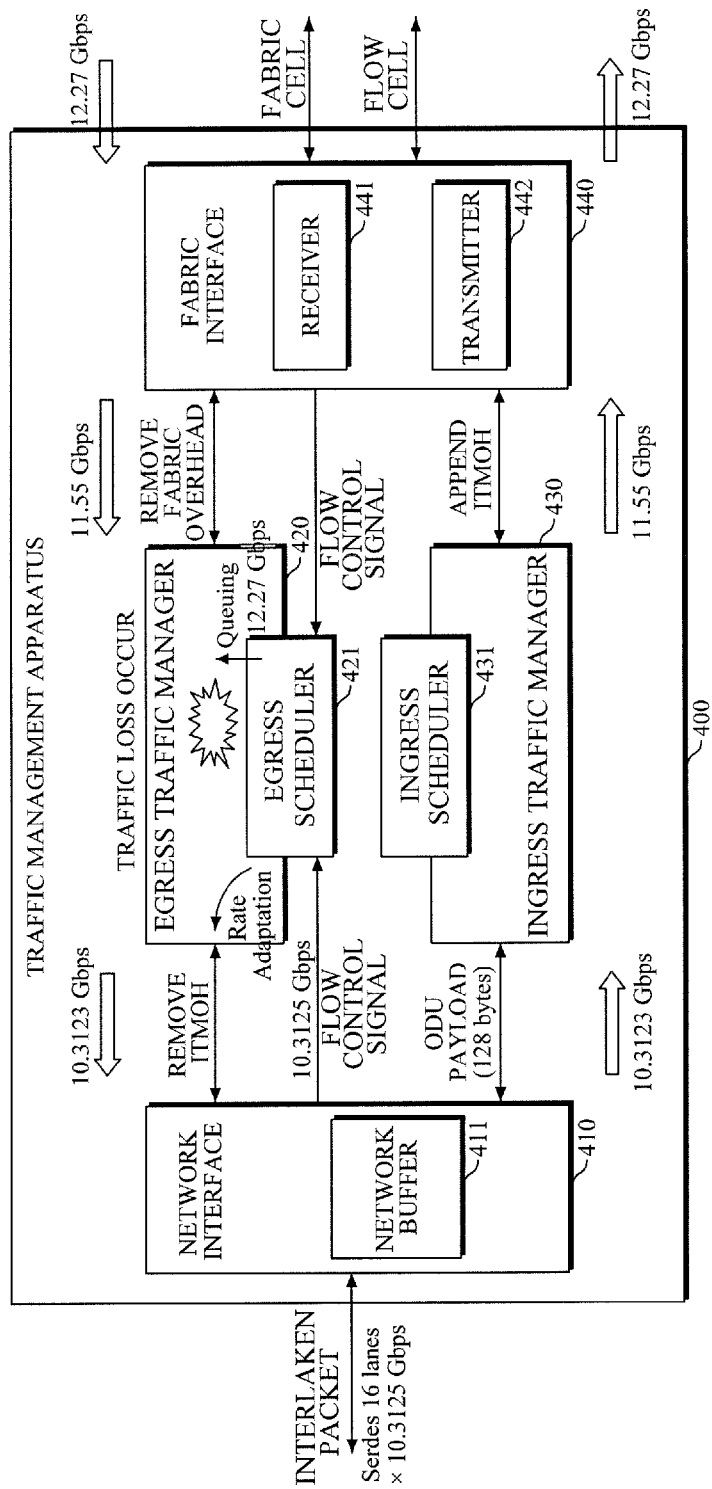
FIG. 6 is a diagram for explaining loss of OTN traffic in an egress traffic manager.

FIG. 6 is a diagram for explaining loss of OTN traffic in an egress traffic manager.

Referring to FIG. 6, traffic loss may occur as OTN traffic passes through the egress traffic manager 410 due to differing enqueuing and dequeuing rates in the egress traffic manager 410. Such traffic loss may cause faults or alarms (e.g., OOF) in transmission of OTN traffic.

If a SerDes of the Interlaken interface consists of 16 lanes of 10.3125 Gbps, the OTN traffic passes through the ingress traffic manager 430 and an ITMOH is added thereto, so that a transfer rate becomes 11.55 Gbps; once the fabric overhead is added, the resultant OTN traffic is transmitted to the multilayer-integrated fabric switch 130 at 12.27 Gpbs.

A fabric cell which has been received from the multilayer-integrated fabric switch 130 at 12.27 Gbps is sent to the fabric interface 440 where the cell is stripped of its fabric overhead so that the transfer rate becomes 11.55 Gbps. The ITMOH is then removed from the resultant fabric cell, so that the fabric cell is transmitted to the network interface 410 at 10.3125 Gbps. Because the packet enqueuing rate of the egress traffic manager 410 is controlled by a flow control packet that is transmitted from the fabric interface 440, packets are stored in an egress traffic queue at 12.27 Gbps.

However, a dequeuing rate of the egress traffic manager 420 at which packets are dequeued from the egress traffic queue to the network interface 440 is 10.3125 Gbps because the dequeuing rate is controlled by a flow control packet that is transmitted from the network interface 410. Thus, the dequeuing rate of the egress traffic manger 420 is lower than the enqueuing rate thereof, thereby resulting in traffic loss in the egress traffic manager 420.

To address the aforementioned problem, an apparatus and method for managing OTN traffic in a packet-circuit integrated transport system based on a multilayer-integrated fabric switch is proposed.

Figure 7:
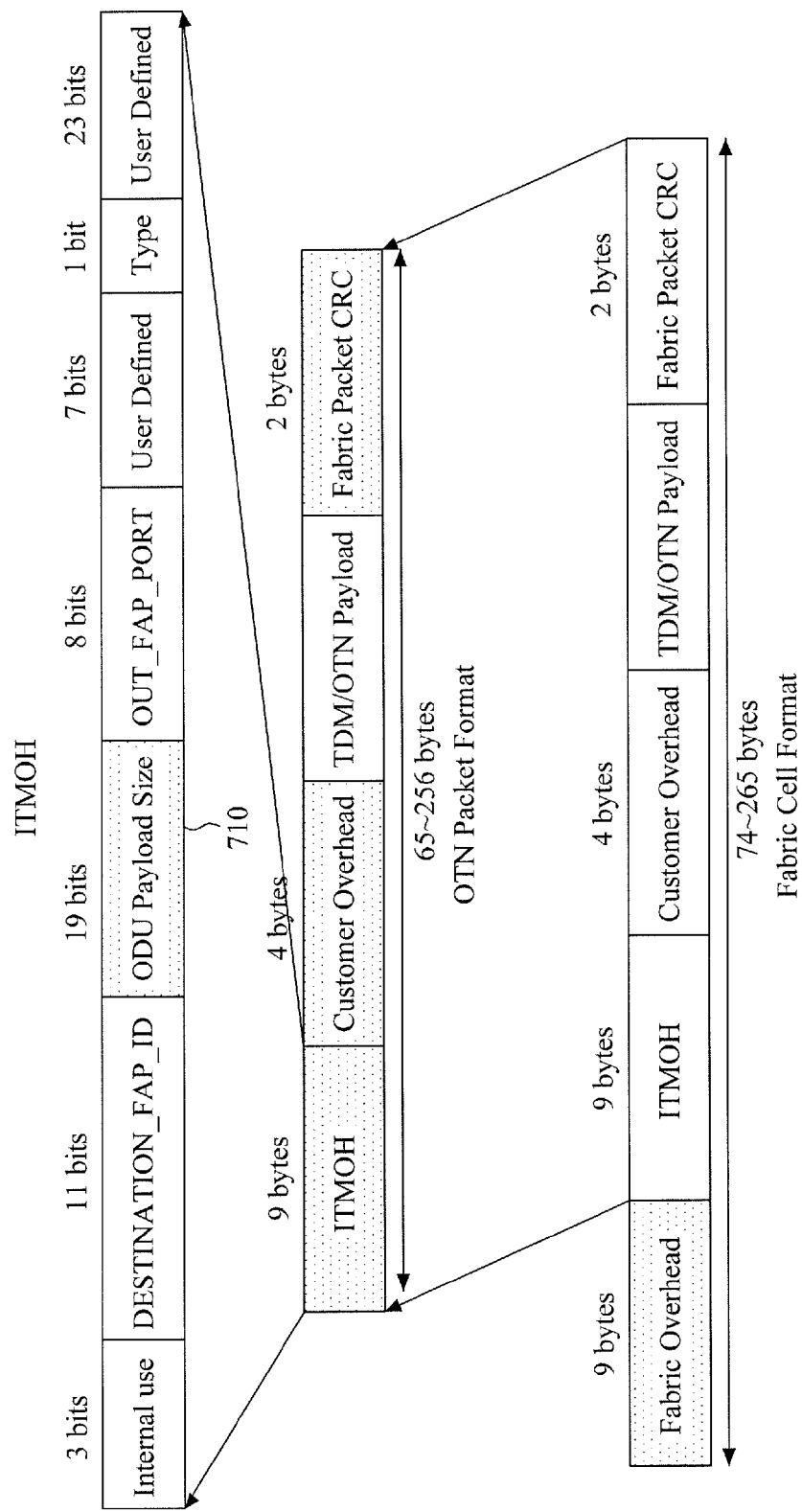
FIG. 7 is a diagram illustrating an ITMOH according to an exemplary embodiment.

FIG. 7 is a diagram illustrating an ITMOH according to an exemplary embodiment.

Referring to FIG. 7, in order to enable an egress traffic manager to recognize the size of an ODU payload, which is OTN traffic, the ODU payload size 710 is written in the 'user_defined' field of the existing ITMOH, which is added to an OTN packet before the OTN packet is transmitted from an ingress traffic manager to a multilayer-integrated fabric switch, as shown in FIG. 7.

Figure 8:
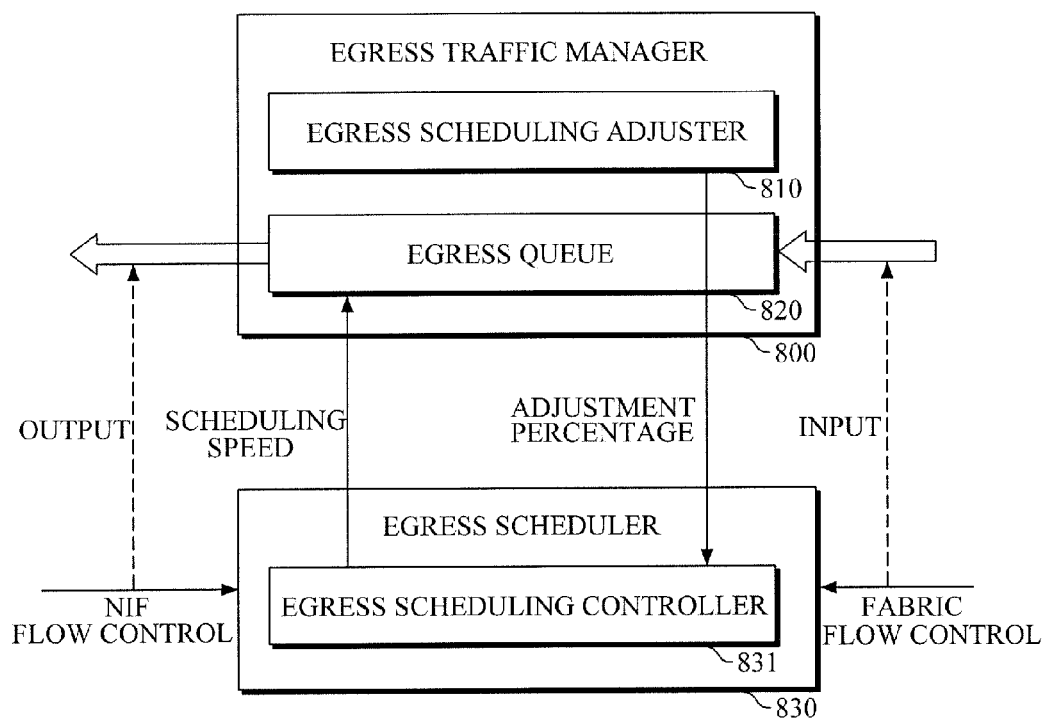
FIG. 8 is a diagram illustrating a configuration of an apparatus for managing OTN traffic according to an exemplary embodiment.

FIG. 8 is a diagram illustrating a configuration of an apparatus for managing OTN traffic according to an exemplary embodiment.

Referring to FIG. 8, the apparatus additionally includes an egress scheduling adjuster 810 to adjust the dequeuing rate so that it is not smaller than the enqueuing rate when an egress scheduler 830 controls rates at which packets are enqueued to and dequeued from an egress queue 820 of an egress traffic manager 800.

The egress scheduling adjuster 810 of the egress traffic manager 800 extracts the ODU payload size from an ITMOH of a received OTN frame. Then, the egress scheduling adjuster 810 calculates an adjustment percentage using Equation 1 with the extracted ODU payload size, the ITMOH size, and the fabric overhead size.

$$\text{Adjustment percentage} = (\text{ITMOH size} + \text{fabric overhead size})/\text{ODU payload size} \quad (1)$$

An egress scheduling controller 831 of the egress scheduler 830 computes an optimal speed for egress scheduling using the adjustment percentage calculated by the egress scheduling adjuster 810 and a port speed that is set by an Interlaken interface. Then, the egress scheduling controller 831 adjusts the enqueuing and dequeuing rates of the egress traffic manager 800 according to the optimal speed for egress scheduling.

The adjustment of enqueuing/dequeuing rates will be described in detail with examples.

For example, if a transfer rate of the SerDes lanes of an Interlaken interface were 10.3125 Gbps and the ODU payload size were 125 bytes, an adjustment percentage (AP) is calculated using Equation 2 as below.

$$AP = [9\, B(\text{ITMOH}) + 4\, B(\text{Customer overhead}) + 2\, B(\text{fabric packet CRC}) + 9\, B\, (\text{fabric overhead})]/125\, B = 0.192 \quad (2)$$

An optimal scheduling speed (SS) of the egress scheduler that reflects the adjustment percentage calculated by Equation 2 is given as shown in Equation 3.

$$SS = 10.3125\ \text{Gbps} \times (1+0.192) = 12.293\ \text{Gbps} \quad (3)$$

In another example, if a transfer rate of the SerDes lanes of an Interlaken interface were 12.5 Gbps and the ODU payload size were 256 bytes, the adjustment percentage and the optimal scheduling speed are given as shown below.

$$AP = [9\, B(\text{ITMOH}) + 4\, B(\text{Customer overhead}) + 2\, B(\text{fabric packet CRC}) + 9\, B\, (\text{fabric overhead})]/256\, B = 0.094$$

$$SS = 12.5\ \text{Gbps} \times (1+0.094) = 13.675\ \text{Gbps}$$

Figure 9:
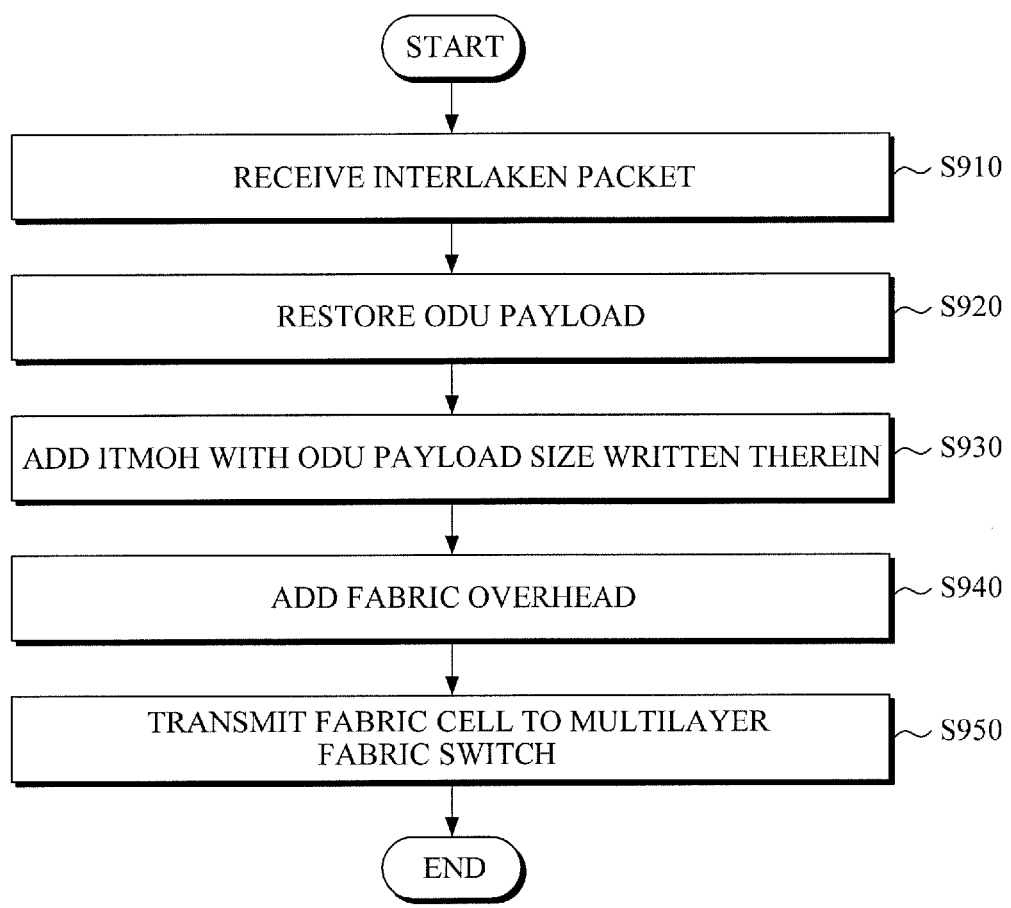
FIG. 9 is a flowchart illustrating operations of an ingress traffic manager according to an exemplary embodiment.

FIG. 9 is a flowchart illustrating operations of an ingress traffic manager according to an exemplary embodiment.

Referring to FIG. 9 in conjunction with FIG. 4, an Interlaken packet is received in S910, and the network interface 410 restores the received Interlaken packet to an OTN frame (ODU payload) in S920.

The ingress traffic manager 430 adds ITMOH into the OTN frame (ODU payload) in S930, wherein the ODU payload size 710 is written in the 'user_defined' field of an existing ITMOH, as shown in FIG. 7, to allow the egress traffic manager to identify the size of the ODU payload, which is OTN traffic.

Then, the fabric interface 440 adds a fabric overhead into the OTN frame from the ingress traffic manager 430 in S940, and the resultant OTN frame with the fabric overhead added thereto is converted into fabric cell and is transmitted to the multilayer-integrated fabric switch in S950.

Figure 10:
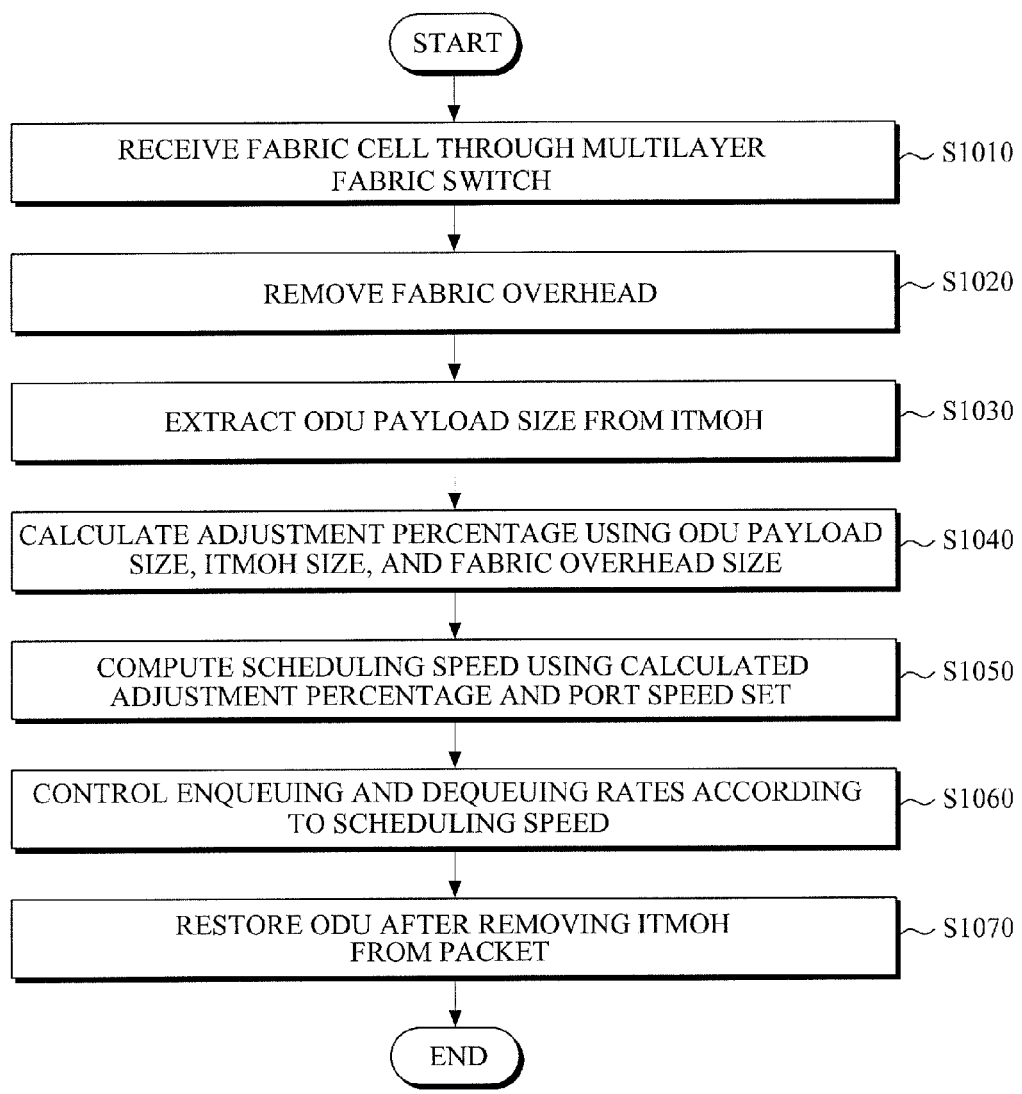
FIG. 10 is a flowchart illustrating operations of an egress traffic manager according to an exemplary embodiment.

FIG. 10 is a flowchart illustrating operations of an egress traffic manager according to an exemplary embodiment.

Referring to FIG. 10 in conjunction with FIG. 4, a fabric cell is received through the multilayer-integrated fabric switch 130 as depicted in S1010, and the fabric overhead is removed from the fabric cell as the fabric cell passes through the fabric interface 440 in the traffic manager 400 as depicted in S1020.

The egress scheduling adjuster 810 of the egress traffic manager 800 extracts an ODU payload size from ITMOH of the OTN frame that has been received in S1030. Then, the adjustment percentage is calculated using Equation 4 with the ODU payload size extracted in S1040, the ITMOH size, and the fabric overhead size.

$$\text{Adjustment percentage} = (\text{ITMOH size} + \text{fabric overhead size})/\text{ODU payload size} \quad (4)$$

In S1050, the egress scheduling controller 831 of the egress scheduler 830 computes an optimal scheduling speed of the egress scheduler using the adjustment percentage calculated by the egress scheduling adjuster 810 and a port speed set by the Interlaken interface.

Then, in S1060, both the enqueuing rate and dequeuing rate of the egress traffic manager 800 are controlled according to the optimal scheduling speed of the egress scheduler.

In addition, after passing through the egress traffic manager 420, ITMOH is removed from the packet as depicted in S1070 before the packet is transmitted to the network interface 410; then the packet is restored to OTN traffic (ODU payload).

According to the exemplary embodiments, it is possible to prevent OTN traffic loss and/or traffic failure in an optical circuit-packet integrated transport system based on a multilayer-integrated fabric switch. In addition, as a scheduling speed of a traffic manager is adjusted according to an ODU payload size of OTN traffic, efficient management of OTN traffic is possible. Thus, the transport capability and performance of OTN traffic in the multilayer-integrated fabric switch-based packet-circuit integrated transport system can be increased.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A traffic management apparatus which is included in an optical transport network (OTN) line card that accepts OTN traffic and transmits the OTN traffic to a multilayer-integrated fabric switch, accepts traffic, in units of cells, from the multilayer-integrated fabric switch, and transmits, to a network, the OTN traffic that the OTN line card generates, the traffic management apparatus comprising:
   a network interface configured to generate an OTN frame from an Interlaken packet, transmit the OTN frame, and receive an OTN frame;
   a fabric interface configured to transmit and receive a fabric cell to and from the multilayer-integrated fabric switch;
   an ingress traffic processor configured to add an internal traffic management overhead (ITMOH) that contains information about an optical channel data unit (ODU) payload size to an OTN frame output from the network interface, and transmit a resultant OTN frame to the fabric interface;
   an egress traffic processor configured to adjust a queueing rate and a dequeuing rate by taking into consideration the ODU payload size written in the ITMOH of the fabric cell output from the fabric interface; and
   wherein the egress traffic processor comprises an egress scheduling adjuster configured to calculate an adjustment percentage by taking into account the ODU payload size written in the ITMOH of the fabric cell output from the fabric interface, and an egress scheduler configured to control scheduling speed based on the adjustment percentage, in response to a flow control packet.

2. The traffic management apparatus of claim 1, wherein the ITMOH has the ODU payload size written into a 'user defined' field.

3. The traffic management apparatus of claim 1, wherein the egress scheduling adjuster extracts the ODU payload size from the ITMOH of the received OTN frame; calculates an adjustment percent using the extracted ODU payload size, an ITMOH size, and a fabric overhead size; and transmit the calculated adjustment percentage to the egress scheduler.

4. The traffic management apparatus of claim 3, wherein the adjustment percentage is calculated by dividing the sum of the ITMOH size and the fabric overhead size by the ODU payload size.

5. The traffic management apparatus of claim 3, wherein the egress scheduling controller computes a scheduling speed therefor using the adjustment percentage calculated by the egress scheduling adjuster and a port speed set by an Interlaken interface, and controls both the enqueuing rate and dequeuing rate of the egress traffic processor according to the calculated scheduling speed.

6. An OTN traffic management method of a traffic management apparatus included in an OTN line card that accepts OTN traffic and transmits the OTN traffic to a multilayer-integrated fabric switch or accepts traffic in units of cells from the multilayer-integrated fabric switch, and transmits, to a network, the OTN traffic that the OTN line card generates, the OTN traffic management method comprising:
   removing the fabric overhead from fabric cell received through the multilayer-integrated fabric switch;
   configuring an ingress traffic processor to add an internal traffic management overhead (ITMOH) that contains information about an optical channel data unit (ODU) payload size to an OTN frame output from the network interface, and transmit a resultant OTN frame to the fabric interface;
   adjusting both an enqueuing and dequeuing rates of egress traffic by taking into account the ODU payload size written in the ITMOH of the fabric cell output from the fabric interface; restoring the fabric cell to an OTN frame by removing the ITMOH from the fabric cell; and
   wherein the adjusting of the enqueuing rate and the dequeuing rate comprises calculating an adjustment percentage by taking into account the ODU payload size written in the ITMOH of the fabric cell, and controlling the scheduling speed based on the adjustment percentage in response to a flow control packet.

7. The OTN traffic management method of claim 6, wherein the calculating of the adjustment percentage comprises: extracting an ODU payload size from an ITMOH of an OTN frame, calculating the adjustment percentage by using the extracted ODU payload size, an ITMOH size, and a fabric overhead size, and transmitting the calculated adjustment percentage to an egress scheduler.

8. The OTN traffic management method of claim 7, wherein the adjustment percentage is calculated by dividing the sum of the ITMOH size and the fabric overhead size by the ODU payload size.

9. The OTN traffic management method of claim 6, wherein the controlling of the scheduling speed comprises computing a speed of egress scheduling using the calculated adjustment percentage and a port speed set by an Interlaken interface and controlling both the enqueuing rate and dequeuing rates of an egress traffic processor according to the computed egress scheduling speed.

* * * * *